United States Patent
Beaule

(10) Patent No.: US 8,522,249 B2
(45) Date of Patent: Aug. 27, 2013

(54) MANAGEMENT OF SOFTWARE IMPLEMENTED SERVICES IN PROCESSOR-BASED DEVICES

(75) Inventor: Stephane Beaule, Montreal (CA)

(73) Assignee: Bluestreak Technology, Inc., Montreal (CA)

( * ) Notice: Subject to any disclaimer, the term of this patent is extended or adjusted under 35 U.S.C. 154(b) by 1083 days.

(21) Appl. No.: 12/163,737

(22) Filed: Jun. 27, 2008

(65) Prior Publication Data

US 2009/0013157 A1    Jan. 8, 2009

Related U.S. Application Data

(60) Provisional application No. 60/946,649, filed on Jun. 27, 2007.

(51) Int. Cl.
G06F 9/445 (2006.01)
(52) U.S. Cl.
USPC ......................................................... 718/104
(58) Field of Classification Search
None
See application file for complete search history.

(56) References Cited

U.S. PATENT DOCUMENTS

| | | | |
|---|---|---|---|
| 5,009,276 A * | 4/1991 | Raikes et al. | 177/25.15 |
| 2002/0073245 A1* | 6/2002 | Hallford | 709/331 |
| 2004/0088415 A1* | 5/2004 | Chandrasekar et al. | 709/226 |
| 2006/0248508 A1* | 11/2006 | Jeghers | 717/114 |
| 2006/0282766 A1* | 12/2006 | Parsell | 715/513 |
| 2007/0124322 A1* | 5/2007 | Meyer et al. | 707/102 |
| 2007/0232394 A1* | 10/2007 | Gazdic et al. | 463/29 |

* cited by examiner

*Primary Examiner* — Eric Coleman
(74) *Attorney, Agent, or Firm* — Marc A. Hubbard; Hubbard Law, PLLC

(57) ABSTRACT

A service management system for devices with embedded processor systems manages use of memory by programs implementing the services by assigning services to classes and limiting the number of services per class that can be loaded into memory. Classes enable achieving predictable and stable system behavior, defining the services and service classes in a manifest that is downloaded to embedded devices operating on a network, such as a cable or satellite television network, telephone or computer network, and permit a system operator, administrator, or manager to manage the operation of the embedded devices while deploying new services implemented with applications downloaded from the network when the service is requested by a user.

36 Claims, 3 Drawing Sheets

MANAGEMENT OF SOFTWARE IMPLEMENTED SERVICES IN PROCESSOR-BASED DEVICES

CROSS-REFERENCE TO RELATED APPLICATIONS

This patent application claims the benefit of Provisional Patent Application Ser. No. 60/946,649, entitled Management of Software Implemented Services In Processor-Based Devices, filed Jun. 27, 2007, the disclosure of which is incorporated herein by reference.

TECHNICAL FIELD OF THE INVENTION

The invention relates generally to managing software implemented services, and more particularly, to service management in non-general purpose computer devices that have limited memory resources for running programs implementing services.

BACKGROUND OF THE INVENTION

Devices with embedded processors typically did not include processing and memory resources matching those of general purpose computers. The embedded processors implement some or all of the device's functionality by executing a limited set of programs stored on the device. Examples of such embedded devices include mobile cellular telephones, personal digital assistants, and set top boxes. Such devices often have just enough working memory to handle their limited functions, include only limited local storage resources, such as non-volatile RAM or ROM, and rarely possess hard disk drives. They have, as compared to general-purpose computers of similar age, components or systems with fewer capabilities.

Services provided by or through the embedded device can be augmented and extended through additional programs. As an example only, a cable television set top box can be programmed to provide additional, interactive services, such as not only an interactive program guide, but also news tickers, RSS feeds, games, email and other such services. Software for these services may not be resident in working memory. When a viewer requests the service, the software is dynamically loaded from a local storage device, such as a hard drive, or more typically from a server on a network to which the embedded service is connected, or from a network file system, such as a broadcast file system (BFS) data carousel.

When a new service is loaded, a decision must be made whether to terminate the other services and whether software for the other services will remain resident in processor working memory. In a typical general-purpose computer, virtual memory can be used for swapping programs and data resident in memory to local storage, such as a hard drive or non-volatile memory, thus effectively increasing the size of working memory. However, even if it had local storage devices such a hard disks, a typical embedded device would not have virtual memory or similar capabilities. Furthermore, the embedded device will also typically have a comparatively simpler operating system than a general purpose or personal computer, and it will not, in most cases, give the user explicit control over applications. Thus, the user cannot decide when applications are loaded or when applications quit.

Without the advantage of virtual memory or a storage device such as a hard drive, dealing with memory allocation problems therefore presents a challenge for embedded devices. Handling memory allocation failure is complex for an applications developer or a system operator responsible for deploying software for implementing services on the device. However, rather than meet the challenge, an approach often used is to terminate programs for other services and reallocate memory to the new program.

SUMMARY

The invention, in a preferred form, is directed to solving one problems arising managing memory or other resources by multiple programs on embedded devices.

In a preferred embodiment of the invention, memory resources for running services on an embedded device are, in effect, budgeted according to a management profile loaded onto the embedded device. The profile establishes classes for the services, and allows determination of the maximum number of services that can be loaded into working memory for each class. Each service class therefore functions as a logical group of services that limits the maximum number of services belonging to the class that can be loaded at the same time. Preferably, at least one service from each class can be loaded into working memory at any given time, with the option, depending on available memory and the memory resources required for a service within a class, of more than one service being permitted to be loaded for any given class. Classes thus ensure that at least one service from each class is not terminated, and permit more than one service to be loaded without running out of memory. As compared to unloading services or simply prioritizing services, classifying services and allocating resources based on class can offer several advantages and benefits.

One advantage of a profile is that it permits, if the embedded device is part of a managed system or network, a system operator to establish and update the profile and load it onto the device, either through the network or during deployment. By establishing classes, a network operator, system manager, device developer, or other person can ensure proper operation of the embedded device. The profile can be downloaded to or updated on the device upon startup of the device, upon the occurrence of some other event, or at some preset schedule or interval.

Use of classes can reduce activation time of important services by retaining some or all of the resources needed for the services in memory, thus avoiding the time it takes to load program resources from, for example, the network.

Furthermore, having multiple classes also permits a system operator, for example, to ensure the embedded device behaves in a more predictable way from the point of view of the user, especially in a situation in which there are multiple third parties supplying programs for the services. For example, if services are prioritized rather than classified, the service that is unloaded when memory runs out will depend on the loaded services at that time. This means that activating service "A", for example, on one occasion will unload service "B." On another occasion, activating service "A" again may result in unloading service "C." In such a system, users will not be able to predict which service will replace which in memory and they will have unpredictable activation times because sometimes the requested service will have to be loaded first. Such a system will tend to aggravate users. Classifying services can be used to ensure that certain services are not unloaded from memory, even if they are of a lower priority.

Finally, allocating memory to classes appropriate to the size of the programs within that class will tend to reduce memory fragmentation. Classes may also be used to allow daemon processes to run in the background such that applications invisible to the user and out of his control could be used to do things like network, service and monitoring of the embedded device.

BRIEF DESCRIPTION OF THE FIGURES

For more complete understanding of the features and advantages of the invention, reference is now made to the detailed description of examples implementing preferred embodiments of the invention, along with the accompanying figures, wherein.

DETAILED DESCRIPTION

The following detailed description is made in reference to a services management system implementing different aspects of a preferred embodiment of the invention. The services management system is intended only as an example to illustrate the subject matter as defined by the appended claims. The scope of the invention is not intended to be limited to this example, but to include such all embodiments and examples coming within the scope of the claims when the terms used in the claims are given their ordinary and customary meaning, and substantial equivalents.

A service is a unit of user functionality, implemented by one or more programs and/or data files being executed by the user device. A service management system could be implemented as part of an operating system or as a separate program that preferably remains resident in memory and running, and controls, among other things, loading and unloading from memory of programs and resources for providing a service requested by a user of the embedded device.

Figure 1:
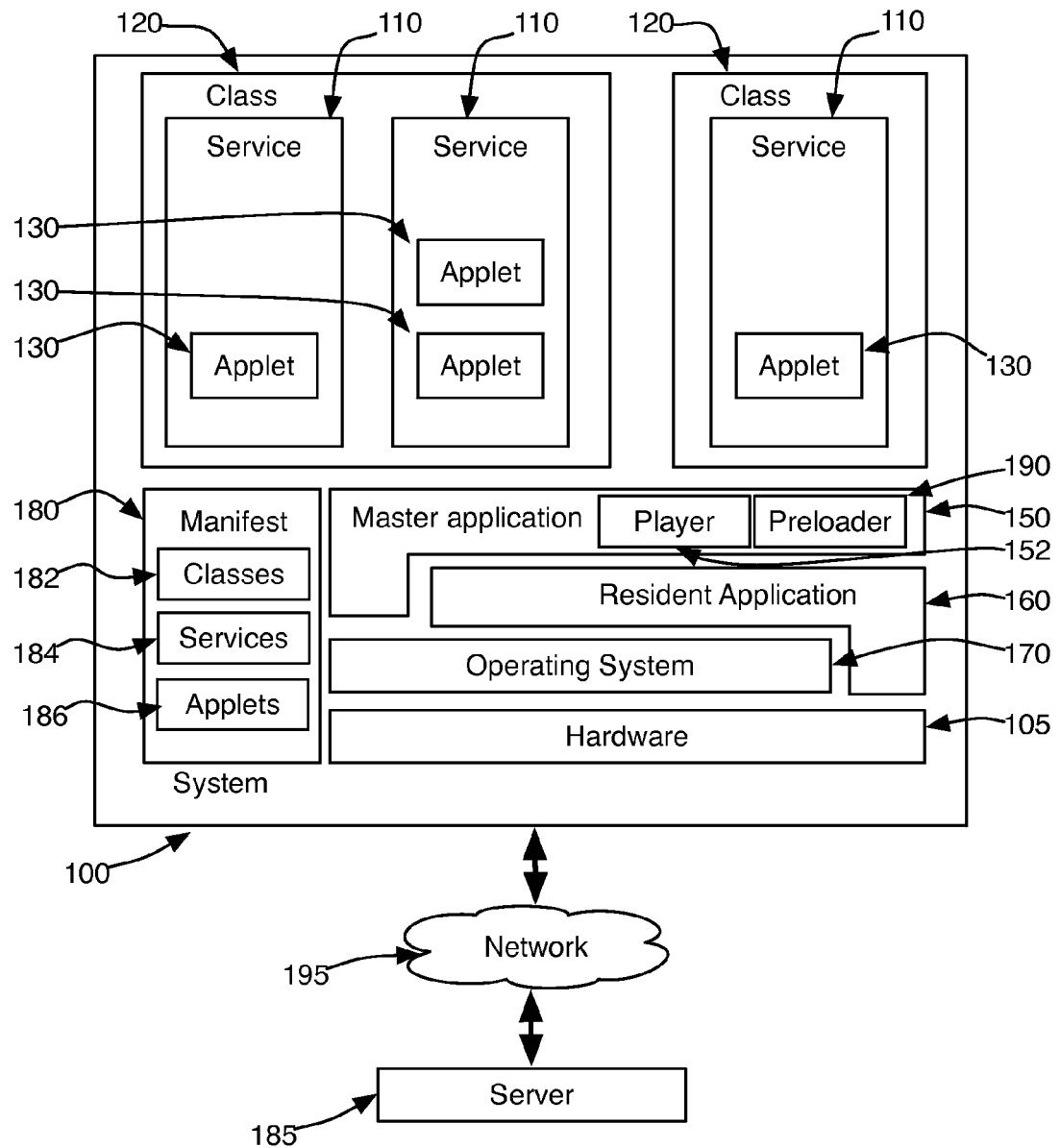
FIG. 1 is a block diagram of software processes on a embedded device.

In the example illustrated in FIG. 1, system 100 represents a device with an embedded microprocessor or substantially similar circuitry and working memory, such as random access memory (RAM), into which program instructions are loaded for execution and data for use by the program stored. The microprocessor, memory and other hardware are represented by block 105. The device could be, for example, a cable or satellite television set top box, a television with such capabilities built into it, a mobile or cellular telephone, or other mobile communication device. The boxes 130, 150, 160 and 170 represent program instructions loaded into memory, capable of being executed by the microprocessor. Not all of the illustrated programs are necessarily active or executing.

A services management system is implemented in the illustrated example as part of a master application 150 rather than as part of operating system 170 or resident application 160. In other words, the master application is performing the tasks of managing use of resources, particularly, but not necessarily limited to, memory, by programs implementing services. Services 110 represent units of user functionality. Services are implemented by applications. A single application could, if desired, implement more than one service. The resident application 160 represents a program or collection of programs that provides the basic, device-specific functionality for the embedded device. For a cable set top box it would provide, among other things, basic cable television set top box functions. The operating system 170 represents a collection of basic functions and services for, among other things, interacting with hardware that can be called by applications running on the embedded device.

In this particular example, services are preferably implemented using "little" applications called applets 130. The applets preferably make calls primarily, if not entirely, to master application 150, rather than to the operating system and/or resident application. The master application handles the tasks of interfacing with the resident application and the operating systems, making calls to the operating system 170 and to the resident application 160 through APIs (not indicated in the figure). As will be discussed, the master application can also be used to manage memory use by services implemented with the applets, and the download of applets from the network.

Although use of a master application is not essential, the master application launching and terminating applets is one way to ensure effective resource management and utilization for the services. Thus, it provides advantages for embedded devices not having a services management system as part of its operating system or resident application. If the advantages of a master program with applets are not desired or required for implementing services, each service could be implemented with an application that calls directly the operating system and resident application, with network management system being implemented separately or, for example, as part of the operating system or resident application. For purposes of this description, and unless otherwise stated in the particular instance, the term "application" will generically refer to applications of all types and sizes, including "applets."

Services are grouped into service classes 120. Two classes are shown in this example, but there could be more than two. A service class is a logical grouping of services that constrains the maximum number of services belonging to the class that can be loaded into memory of the device at the same time. If another service of the same class needs to be loaded and the maximum number of services is already loaded, the application(s) used to provide the service and any resources used by it (at least to the extent that are not shared) are unloaded from memory based on a predetermined scheme. Preferably, all defined classes fit in memory at the same time. Unloading the current service of a class before loading a new one helps to ensure enough free memory for the system to operate to improve chances of having a long running stable system. No matter how well software for the services is written, an embedded device with low memory capacity can eventually become unstable and may crash. Because all classes preferably fit in memory at the same time, and the current service of a class is unloaded before loading a new one, there should always be enough free memory for the system to operate and an increased likelihood of a long-running stable system is obtained.

Figure 2:
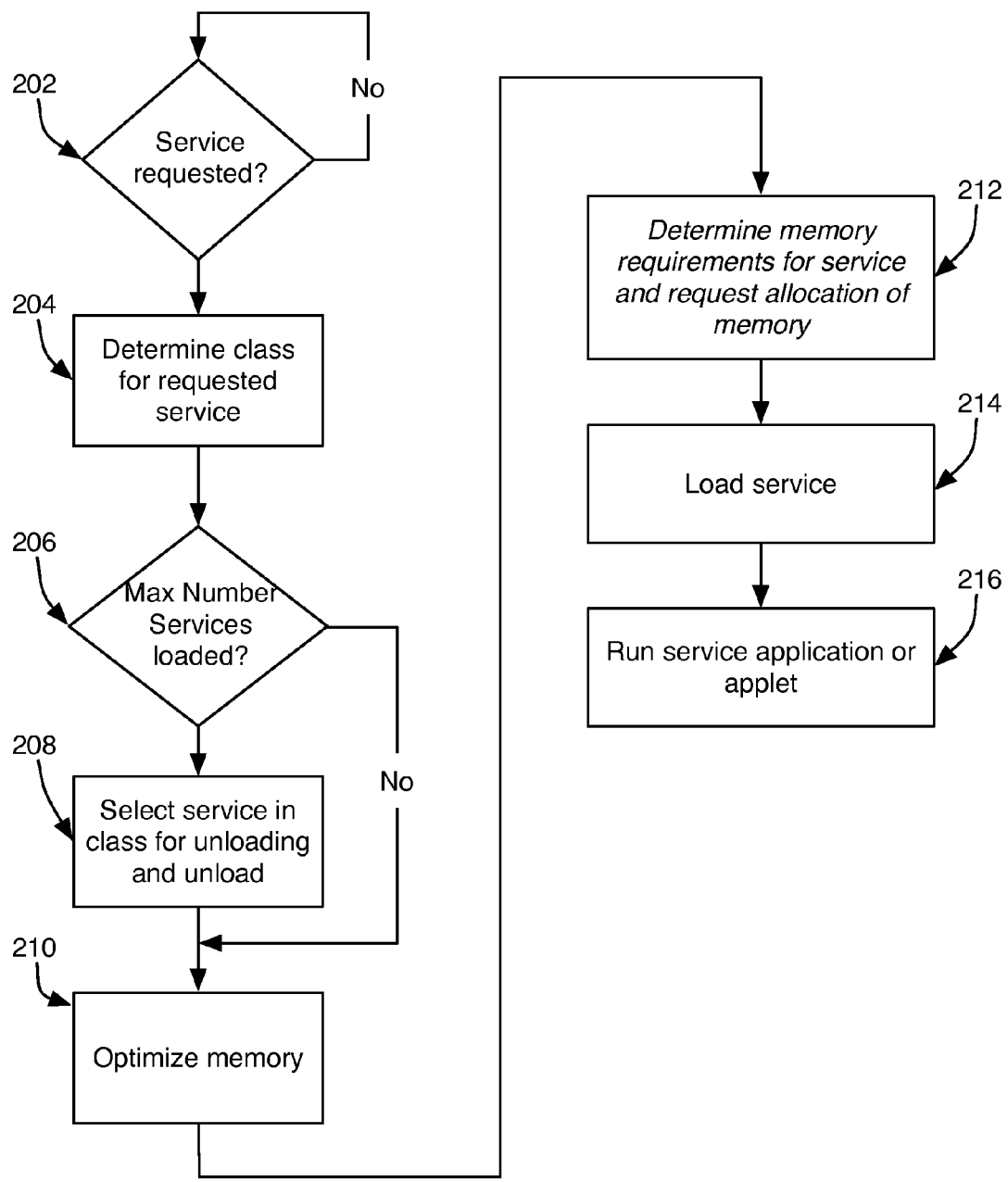
FIG. 2 illustrates a flow diagram of basic steps of a process for activating a service and managing memory usage by services.

FIG. 2 illustrates basic steps of processes of loading services and managing memory use by services. When a user of the device selects or requests a new service, as indicated by step 202, the process determines at step 204 the class for the service and determines at step 206 whether a maximum number of services for the class are already loaded in working memory. If a maximum number of services for the class is already loaded, a loaded service in the class is selected for unloading. The application and preferably also any non-shared resources, for the selected service are unloaded at step 208. More than one service could be selected for unloading. Typically, the oldest service—the one that was least recently used—is chosen for unloading. However, a priority scheme based on other criteria could be used for selecting a service for unloading.

The maximum number of services is preferably set to a predetermined number. It could also, or alternately, be dynamically determined at the time based on available memory known sizes of the applet and related sources of the service, available memory, and other criteria. For example, a system manager sets a class maximum to three services. During runtime, if it is determined that an insufficient amount of memory would be freed by unloading just one service, then two services could be unloaded. The two services being unloaded are chosen based on a priority scheme, such as time since last use or a combination of criteria.

Furthermore, it may not always be possible to perfectly budget available memory using service classes. Memory fragmentation makes it hard to completely budget memory. Even if the memory is available, it may be too fragmented to be usable. Also, services of a class will not always be the same size. The class will not therefore always use the same amount of memory; budgeting for the worst case of each class may be too restrictive. Therefore, there may be a situation in which there will not be enough memory to load the requested service after unloading one or more services in a class. When this happens, service priorities are preferably used by the management system to choose which service should be unloaded to make room.

After unloading of a service, the process will, optionally, request or handle optimization of memory at step 210 in order to maximize contiguous free memory spaces in order to reduce memory fragmentation. At step 212, memory requirements for the service are (if they have not already been determined) determined and memory allocation is requested of the operating system for the application and additional resources required for the service. The application for the service is then loaded and run, as indicated by steps 214 and 216. During development of an applet or other application implementing (in whole or in part) a service, the memory requirement information is, preferably, included in the applet. This allows the master application to know in advance the memory requirements of each applet before they are started.

The process of FIG. 2 is performed by or under the control of the master application 150, though it could be, as previously indicated, implemented by other programs running on the embedded device.

Referring to FIG. 1, the information used by the process of FIG. 2 for determining which class a service belongs to and the maximum number of services permitted for a class is stored in a listing 182 in a manifest 180. The manifest is implemented, for example, as one or more files stored on the embedded device. The one or more files containing the manifest are, in this example, preferably downloaded from one or more servers, represented by server 185 in FIG. 1, over a network 195 to which the embedded device is connected (or connectable) for communication. This permits updating of the manifest by an operator, administrator or manager. Additional information may be stored in the manifest. In a preferred implementation, the manifest is stored as part of one or more XML files; however, no particular type of file need be used. In the exemplary embodiment of FIG. 1, the one or more files storing manifest 180 comprises, at least in part, a configuration file for master application 150. The manifest thus represents and embodies at least in part a management profile for the services management system for a particular type of embedded device. Different management profiles are typically defined for different types of embedded devices, as well as embedded devices of the same type but different capabilities. Thus, for example, the management profile for an embedded device with 8 MB of memory will need to be more restrictive in terms of memory resource allocations than the management profile for the same type of device having 16 MB of memory.

In an exemplary embodiment of the manifest, service class is defined as a name, a list of services comprised in the service class, and a maximum number of services belonging to the service class that can be loaded at one time. The service class definitions are indicated by block 182 in FIG. 1. A service definition preferably indicates its name, its default application (or applet) and its priority. Service definitions are indicated by block 184 in FIG. 1. In a preferred embodiment, the manifest further comprises applet definitions 186 and management profiles (not indicated). Applet definitions tell the master application the files to preload before launching an applet. Management profiles tell the master application how the services should be managed on a specific type of embedded device. The manifest may also include parameters such as a logging server IP address and an HTTP proxy address. The configuration file storing the manifest 180 can be changed at anytime. The master application preferably looks for changes to the manifest stored on a network, such as on a broadcast file system, every time it is activated. The master application preferably runs on the most current manifest.

A services management system allows network operators and other types of managers of embedded devices to prioritize some services over others so that activation of important services takes less time, minimizes memory fragmentation, and allows daemon applets to run in the background out of the user's control and sight. In turn, applications are invisible to the user and out of the user's control and can be used for tasks such as, networking, servicing, and, in the example of cell phones, monitoring of the telephone, for example. The service management system allows prioritizing of some services over others so that activation of important services takes less time.

The services management system also enables predictable system behavior from the point of view of the user. By using classes, an embedded device's memory can be budgeted in such a way that service unloading will be easily predictable so that it can be documented to users. Even if documentation is not presented to the users, users may pick up the budgeting and classes by themselves because of, in part, the predictability and repeatability of the management process. As an example, consider a cable television set top box having a service guide, Internet browser and ten games. The service guide uses 500 KB of RAM, the browser 3000 KB and the games use 1000 KB each. Assume that the device only has 8000 KB of RAM and 5000 KB of free RAM after the resident application and the master application are loaded. The following service classes could be defined: a guide class for the service guide, a browser class for the Internet browser; and a game class for all 10 games. The limit of loaded services for each class is set to one. In the present example, this only affects the game class because it is the only class with more than one service. The service guide and the browser will always be in working memory and will be available in an instant. Also, there will always be one game instantly available. When the user activates another game, the one that was already loaded will be the service that is unloaded. Unloading the previous game to load a new game can be readily understood and anticipated by the user. If some devices to be served have 16 MB of RAM, the priority classes could afford to load 9 games at the same time. Another management profile for the 16 MB STBs could be readily defined to allow 9 games loaded at a time. The only change needed would be to raise the limit of loaded services of the game class to 9. In turn, 9 out of 10 of the games could be loaded at the same time.

The manifest also preferably includes an indicating priority for each service. Service priority is beneficial because it may not always be possible to perfectly budget available memory using service classes. Memory fragmentation makes it hard to completely budget memory because even if the memory is there, it may be too fragmented to really be usable. Also, services of a class will not always be the same size so that the class will not always use the same amount of memory and budgeting for the worst case of each class may be too restrictive.

When the master application 150 is deployed side by side with other services not managed by the master application, instead of budgeting all the device's memory with the master application acting as the service management system, a network operator or other manager of the embedded device decides the amount of memory to leave for other services. The total amount of memory that the master application is allowed to use can be specified in the configuration file for the master application. If the master application is unable to allocate memory for its own use, it preferably compares the total memory that it is using with the limit that it is allowed to use. If it is using less than the limit, it could, for example, ask the resident application to make room. The resident application will in turn ask the other services to free some memory. On the other hand, if the master application is already using its limit, it can free memory internally by unloading the service with the smallest priority. If one of the other unmanaged services runs out of memory, it will also ask the resident application to make room. In turn, the resident application will ask the master application to free memory and the master application will unload the low priority service.

Turning now to details of preferred implementations of applets, applets in the preferred embodiment can be written in a high level language such as C++, resembling a standard event-driven computer program or a multimedia application, such as an application written in an animated graphics platform such as Adobe® Flash®, Microsoft®, Silverlight® or similar platform. In an applet written in a high level language, events such as activation requests and suspension requests are sent to the applet by the master application via messages. User input, such as remote control keys, are preferably sent to the applet by the master application via messages, as well. An applet written in a multi-media authoring environment, such as Adobe® Flash®, movie stored in a SWF file is simpler than a C++ applet because a player on the embedded device controls all the different applet states automatically without messages sent via the master application. The script interpreter in the player, such as an Action Script interpreter in a player that plays SWF files, has built-in script objects such that the SWF encoded applet can make calls to control screen viewing size, or to activate other applets and services.

The compiled code of a C++ applet is preferably packaged in a component form. In a preferred embodiment, components are the smallest unit of native code that the master application manages. Even if a service is made up of several components, each component can be loaded and unloaded independently by the master application. An applet component is simply the compiled code of a C++ applet packaged in a component form. A shared component is a C++ shared library packaged in the same way. According to another exemplary embodiment, functionality shared by more than one applet can be packaged in a shared component instead of being included in all the applets that need to use it. Shared components reduce the bandwidth used on a network or on, for example, a broadcast file system, from which the components are downloaded, and the physical memory used on the processor-based device.

Therefore, in this exemplary embodiment, a player 152 for reading, interpreting and rendering animated graphics or multimedia files, such as SWF encoded files, is implemented as a shared component. The master application uses the player 152 to execute multimedia applets, for example those encoded in a SWF file. Since the player is a shared component, only one player is needed even if there are multiple multimedia applets.

Any kind of data that an applet needs for execution is a resource. Sounds, images, and string tables are examples of resources, but this list is not exhaustive. Related resources can, preferably, be put into a single file, called a resource package. An applet may use two types of resource packages, a localized resource package and a non-localized resource package. Localized packages may contain all language-dependent resources. A non-localized package may contain all the language-independent resources.

For example, in an exemplary embodiment, a localized resource package file will be available on the network to which an embedded device belongs for each supported language. The master application's preloader 190 (FIG. 1) will automatically select the correct localized package file when the applet is loaded from the network. Resources and resource packages are preferably shared by applets to minimize memory and bandwidth requirements.

Referring now only to FIG. 1, all the files needed for an applet 150 to run are preferably indicated in the applet section 186 of the manifest 180. When an applet needs to be loaded, the preloader 190 loads all the necessary files simultaneously from the network, which can be from a designated server on the network or from, for example, a network file system or broadcast file system. When the files are stored on a broadcast file system, a manifest specifying that all files that need to be loaded allows all of them to be loaded in a single carousel cycle, rather than sequentially over several cycles. When the applet is launched, its resources will already be loaded and it will be ready to run immediately.

Preloader 190, which could be made part of the master application 150, executes a process of loading of applets 130 from a network location. One example of a preloader is described in United States published patent application no. 2007/0033239 A1, titled "Preloading resources from data carousel of broadcast file system," which is incorporated herein by reference. In a cable television system, the applets could be downloaded from a broadcast file system, for example. In the illustrated example, a modular approach is preferably used to load applets. An applet may need several files to run, to include, the applet component or applet code, a localized resource package, and a non-localized resource package. All the files needed for an applet to run are indicated in the corresponding applet definition 186 of the manifest 180. When an applet needs to be loaded, the preloader 190 loads all the necessary files simultaneously from, for example, the broadcast file system, allowing all needed files to be loaded in a single carousel cycle. Further, when an applet is launched, its resources will be already loaded and it will be ready to run immediately. The use of the preloader and the modular method results in low bandwidth demands without sacrificing fast loading times.

Another advantage of a master application separate from a resident application or operating system is that it can be adapted to existing embedded devices without modifying the resident application or operation system. For example, in a television set top box, the master application can link a service application manager (SAM), which is part of the resident application, to an applet being executed with the master application. In the SAM entry for the service, the master application is specified as the application for the service. The resident application will activate the master application when the resident program desires to activate service. The name of the service is put in a parameter string for the SAM entry. The name of the service is then used by the master application to look up specific information on the service in the manifest, which is the illustrated example stored as part of the manifest. When the master application is told by the resident application to activate the service for the first time, the master application will load the default applet for that service, if it is not already loaded, and will then activate the default applet.

Service implementation need not be limited to only one applet. An applet can activate other applets, without directions from the resident application. The master application will load the called applet, suspend the active applet, and activate the newly loaded applet. Inside a service, applets are preferably stacked. When the top one quits, the previous one is reactivated. If the service is suspended by the resident application, the master application will suspend the top applet. When the resident application reactivates the service, the master application will reactivate the top applet of the service.

Figure 3:
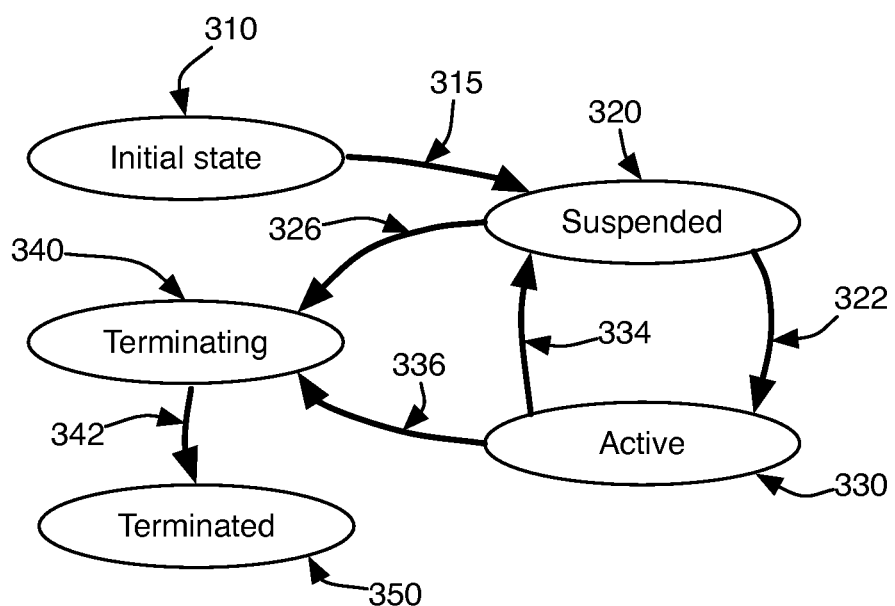
FIG. 3 shows five exemplary high-level states for an applet running in accordance with an embodiment of the present invention and messages associated with state transitions.

FIG. 3 illustrates a state machine which, in a preferred embodiment, each applet implements. At least five high-level states are supported: initial state 310; suspended state 320; active state 330; terminating state 340; and terminated state 350. These states are intended to be representative only. Fewer or more states could be supported.

The initial state 310 is at the start of the applet, when the applet is instantiated and the applet performs its initialization. During this time the master application initializes the runtime environment. When the initialization by the master application is completed, the main thread of the applet receives a message 315. After receiving the message 315, the applet moves to the suspended state 320. In a preferred embodiment, two events can start an applet. In one event, the resident application tells the master application to activate service when the service is not already loaded in the embedded device. When this event starts an applet, the master application preferably loads and starts the default applet for the desired service. In another event, a first applet causes a second applet to be started by calling a predefined method to activate the second applet. In the suspended state, a suspended applet is not the active applet. There is no interaction with the user in the suspended state. When a user of the embedded device reactivates the applet, the main thread will receive a message 322 to indicate that the applet should go into the active state. A second message can be received to exit the suspended state 320. When message 326 is received, the applet will go to the terminating state 340 and quit 350. This message could be received by the applet if the master application needs more memory and frees memory by quitting some service. Message 336 can also change an active state 330 to the terminating state 340. From the terminating state 340, message 342 changes the state to terminated 350.

The foregoing description is of exemplary and preferred embodiments implementing different aspects and teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments. None of the description should be read as implying that any particular element, step, or function is an essential element which must be included in the claim scope: the scope of patented subject matter is defined only by the allowed claims. None of these claims are intended to invoke paragraph six of 35 USC §112 unless the exact words "means for" or "steps for" are followed by a participle.

What is claimed is:

1. A method managing memory usage by services on a device comprised of an embedded processor and a memory for storing program files and data to be executed and read by the processor, the method comprising:
    storing in the memory a manifest specifying a plurality of services available to users of the device, the manifest storing information identifying for each of the plurality of the services at least one application file for executing the service on the embedded processor; the information in the manifest further identifying for each of the plurality of service a class to which it is assigned and information for determining a maximum number of services for each class permitted to be loaded into the memory at a single time;
    upon receiving a request to load a service on the embedded device, determining using the information stored in the manifest, which of the plurality of classes the requested service belongs to and whether a maximum number of services for the class are loaded in the memory; and
    prior to loading into memory the application for the requested service, unloading from the memory an application for a previously loaded service in the class to which the requested service belongs in response to determining using the information stored in the manifest that the maximum number of services for the class are loaded in the memory.

2. The method of claim 1, wherein the method further comprises downloading the manifest from a network to which the device is connected.

3. The method of claim 1, wherein the device further comprises a master application loaded and executing in memory, and wherein each of the plurality of services is implemented as an applet making calls to the master application.

4. The method of claim 3, wherein the manifest specifies an amount of the memory to be allocated for all services.

5. The method of claim 1, wherein the manifest further comprises indications of prioritization of the services.

6. The method of claim 5, further comprising unloading from the memory the application for the service not in use having the lowest priority when insufficient memory is available for allocation to services.

7. The method of claim 6, wherein the manifest specifies an amount of the memory to be allocated for all services.

8. The method of claim 1, wherein application for the requested services is downloaded from a network to which the device is connected after the service is requested.

9. The method of claim 1, wherein at least one of the plurality of services is implemented with an application comprised of a multimedia file, and wherein a multimedia player executing on the embedded device reads and plays the multimedia file.

10. An apparatus comprising,
    an embedded processor;
    a memory for storing program files and data to be executed and read by the processor;
    a manifest stored in the memory including a manifest specifying a plurality of services available to users of the device, the manifest storing information identifying for each of the plurality of the services at least one application file for executing the service on the embedded processor; the information stored manifest further identifying for each of the plurality of service a class to which it is assigned and information for determining a maximum number of services for each class permitted to be loaded into the memory at a single time; and program instructions stored in memory for execution by the processor and adapted for responding to a request for a new service made to the apparatus, by determining using the information stored in the manifest to which of the plurality of classes the requested service belongs;

determining using the information stored in the manifest whether a maximum number of services for the class of the requested service are loaded in the memory;

prior to loading into memory an application for the requested service, causing unloading from the memory an application for a previously loaded service in the class to which the requested service belongs in response to determining that the maximum number of services for the class are loaded in the memory; and allocating space in memory for an application for the application for the requested service and causing loading of the application for the requested service.

11. The apparatus of claim 10, wherein the apparatus is connected to a network and wherein the program instructions are adapted for causing downloading the manifest from the network.

12. The apparatus of claim 10, wherein the program instructions are comprised of a master application, and wherein the requested service is implemented as an applet making calls to the master application.

13. The apparatus of claim 12, wherein the manifest specifies an amount of the memory to be allocated for all services.

14. The apparatus of claim 10, wherein the manifest further comprises indications of prioritization of the services.

15. The apparatus of claim 14, wherein the program instructions are adapted for unloading from the memory the application for the service not in use having the lowest priority when insufficient memory is available for allocation to services.

16. The apparatus of claim 15, wherein the manifest specifies an amount of the memory to be allocated for all services.

17. The apparatus of claim 10, wherein program instructions are adapted for causing downloading of the application for the requested services from a network to which the apparatus is connected, after the service is requested.

18. The apparatus of claim 10, wherein at least one of the plurality of services is implemented with an application comprised of a multimedia file, and wherein a multimedia player executing on the embedded device reads and plays the multimedia file.

19. The apparatus of claim 10, wherein the apparatus is selected from the group consisting of a cable television set top box, a satellite television set top box, and a wireless telephone.

20. A non-transitory computer readable medium carrying computer instructions for execution by a processor embedded in a device, instructions for adapting the device to respond to a request for a new service made to the device, by determining to which of a plurality of classes the requested service belongs, the class of the service being determined by reference to a manifest storing information indicating the class to which the requested service belongs;

determining using the information stored in the manifest whether a maximum number of services for the class of the requested service are loaded in the memory;

prior to loading into memory an application for the requested service, causing unloading from the memory an application for a previously loaded service in the class to which the requested service belongs in response to determining that the maximum number of services for the class are loaded in the memory; and causing loading of the application for the requested service.

21. The non-transitory computer readable medium carrying computer instructions of claim 20, wherein the program instructions are adapted for causing downloading of the manifest from a network to which the device is connected.

22. The non-transitory computer readable medium carrying computer instructions of claim 20, wherein the program instructions are comprised of a master application, and wherein the requested service is implemented as an applet for making calls to the master application.

23. The non-transitory computer readable medium carrying computer instructions of claim 22, wherein the manifest specifies an amount of the memory to be allocated for all services.

24. The non-transitory computer readable medium carrying computer instructions of claim 20, wherein the program instructions are adapted for unloading from the memory the application for the service not in use having the lowest priority when insufficient memory is available for allocation to services, the program instructions being adapted to obtain the prioritizing from the manifest, the manifesting indicating prioritization of the services.

25. The non-transitory computer readable medium of claim 24, wherein the manifest specifies an amount of the memory to be allocated for all services.

26. The non-transitory computer readable medium carrying computer instructions of claim 20, wherein program instructions are adapted for causing downloading of the application for the requested services from a network to which the apparatus is connected.

27. The non-transitory computer readable medium carrying computer instructions of claim 20, wherein the program executions are adapted for assisting with playback of an application for a service implemented as a multimedia file.

28. Apparatus comprising one or more servers for storing applications for implementing any one of a plurality of services on the at least one embedded device, the applications available for downloading to the at least one embedded device over the network;

at least one embedded device in communication with the server over a network;

the device comprising, an embedded processor;

a memory for storing program files and data to be executed and read by the processor;

program instructions stored in memory for execution by the processor and adapted for responding to a request for a new service made to the apparatus, by determining to which of the plurality of classes the requested service belongs using a manifest, the manifest storing information specifying a plurality of services available to users of the device, the information stored in the manifest identifying for each of the plurality of the services at least one application file for executing the service on the embedded device; the information stored in the manifest further identifying for each of the plurality of service a class to which it is assigned and information for determining a maximum number of services for each class permitted to be loaded into the memory at a single time;

determining based on the information stored in the manifest whether a maximum number of services for the class of the requested service are loaded in the memory;

prior to loading into memory an application for the requested service, causing unloading from the memory an application for a previously loaded service in the class to which the requested service belongs in response to determining that the maximum number of services for the class are loaded in the memory; and allocating space in memory for an application for the application for the requested service and causing loading of the application for the requested service.

29. The apparatus of claim 28, wherein the program instructions are adapted for causing downloading the manifest from the one or more servers.

30. The apparatus of claim 28, wherein the program instructions are comprised of a master application, and wherein the applications are comprised of applets making calls to the master application.

31. The apparatus of claim 28, wherein the manifest specifies an amount of the memory to be allocated for all services.

32. The apparatus of claim 28, wherein the manifest further comprises indications of prioritization of the services, and wherein the program instructions are adapted for unloading from the memory the application for the service not in use having the lowest priority when insufficient memory is available for allocation to services.

33. The apparatus of claim 32, wherein the manifest specifies an amount of the memory to be allocated for all services.

34. The apparatus of claim 28, wherein the program instructions are adapted for causing downloading of the application for the requested services from the at least one or more servers after the service is requested.

35. The apparatus of claim 28, wherein at least one of the plurality of services is implemented with an application comprised of a multimedia file, and wherein a multimedia player executing on the embedded device reads and plays the multimedia file.

36. The apparatus of claim 28, wherein the apparatus is selected from the group consisting of a cable television set top box, a satellite television set top box, and a wireless telephone.

* * * * *